US012618529B2

(12) United States Patent
Lee

(10) Patent No.: US 12,618,529 B2
(45) Date of Patent: May 5, 2026

(54) NOZZLE FOR PRESSURE VESSEL AND PRESSURE VESSEL INCLUDING THE SAME

(71) Applicants: Hyundai Motor Company, Seoul (KR); Kia Corporation, Seoul (KR)

(72) Inventor: Dong Sun Lee, Hwaseong-Si (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/670,466

(22) Filed: May 21, 2024

(65) Prior Publication Data

US 2025/0198572 A1 Jun. 19, 2025

(30) Foreign Application Priority Data

Dec. 13, 2023 (KR) ........................ 10-2023-0181221

(51) Int. Cl.
*F17C 13/06* (2006.01)

(52) U.S. Cl.
CPC ...... *F17C 13/06* (2013.01); *F17C 2203/0604* (2013.01); *F17C 2205/0302* (2013.01); *F17C 2209/228* (2013.01)

(58) Field of Classification Search
CPC .............. F17C 2205/0305; F17C 13/06; F17C 2203/0604; F17C 2205/0302; F17C 2209/228; F17C 13/002; F17C 2221/012; F17C 2223/0123; F17C 1/16; F17C 2201/0109; F17C 2201/056; B05B 1/005
USPC .......................................................... 220/581
See application file for complete search history.

(56) References Cited

U.S. PATENT DOCUMENTS 6,135,308 A 10/2000 Fang
8,087,537 B2 1/2012 Otsubo et al.
8,505,762 B2 8/2013 Holbach et al.
8,668,108 B2 * 3/2014 Yeggy .................. F17C 13/002 220/589
2008/0251520 A1 10/2008 Ota et al.
2010/0025411 A1 * 2/2010 Otsubo ..................... F17C 1/14 220/581
2011/0210515 A1 9/2011 Sharp et al.
2015/0197382 A1 * 7/2015 Aoe .......................... F17C 1/00 206/524.3
2021/0102665 A1 4/2021 Mahieu et al.

FOREIGN PATENT DOCUMENTS

DE 102019127000 A1 * 4/2021 ................ F17C 1/00
EP 0821194 A2 * 1/1998 ................ F17C 1/16

OTHER PUBLICATIONS

English Machine Translation of EP-0821194-A2 (Year: 1998).*
English Machine Translation of DE-102019127000-A1 (Year: 2021).*

* cited by examiner

*Primary Examiner* — Laura E. Parker
(74) *Attorney, Agent, or Firm* — MORGAN, LEWIS & BOCKIUS LLP

(57) ABSTRACT

In a nozzle for a pressure vessel, and a pressure vessel including the same, the nozzle connected to a liner forming a pressure vessel includes a connecting portion, a lower side of which is connected to the liner, and including an internal passage fluidically-communicating with an interior of the liner, and a tubular first nozzle portion mounted on an upper side of the connecting portion, and being detachable from the connecting portion.

8 Claims, 15 Drawing Sheets

NOZZLE FOR PRESSURE VESSEL AND PRESSURE VESSEL INCLUDING THE SAME

CROSS-REFERENCE TO RELATED APPLICATION

The present application claims priority to Korean Patent Application No. 10-2023-0181221, filed on Dec. 13, 2023, the entire contents of which is incorporated herein for all purposes by this reference.

BACKGROUND OF THE PRESENT DISCLOSURE

Field of the Present Disclosure

The present disclosure relates to a nozzle for a pressure vessel, and a pressure vessel including the same.

Description of Related Art

A fuel cell electric vehicle (FCEV) refers to a vehicle which is driven by supplying electric power to an electric motor with fuel cells. The FCEV mainly utilizes hydrogen as a fuel. Therefore, to use hydrogen, hydrogen is filled in a pressure vessel.

The pressure vessel requires structural robustness because it has to store high-pressure hydrogen. The pressure vessels for storing a high-pressure hydrogen gas are classified into four types, including type I, type II, type III, and type IV, depending on materials used and methods of reinforcing a complex material.

Among them, a type IV pressure vessel includes a metallic nozzle, a liner formed of a non-metallic material, and a complex material manufactured by wrapping carbon fiber or glass fiber on the liner in circumferential and longitudinal directions.

In the case of a nozzle of a type IV pressure vessel, a high pressure is applied, and thus a weak portion occurs in a boss neck. Accordingly, it is necessary to increase a structural rigidity of the boss neck to reinforce a local vulnerable area, but when a thickness of the boss neck is increased to satisfy this, an operating efficiency of the vehicle is reduced due to an increase in an overall weight of the pressure vessel.

Furthermore, methods for fixing the pressure vessel are classified into a neck mounting method and a valley mounting method, and a length of a nozzle part required varies depending on the fixing method. The neck mounting method includes a fixed part and a sliding part, and even in the instant case, the required nozzle lengths are different. Accordingly, various types of nozzles with different lengths have to be provided.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a nozzle for a pressure vessel, by which an overall weight of the pressure vessel may be reduced, and a pressure vessel including the same.

An aspect of the present disclosure also provides a nozzle for a pressure vessel nozzle, a length of which is adjustable, and a pressure vessel including the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a nozzle for a pressure vessel connected to a liner forming a pressure vessel includes a connecting portion, a lower side of which is connected to the liner, and including an internal passage fluidically-communicating with an interior of the liner, and a tubular first nozzle portion mounted on an upper side of the connecting portion, and being detachable from the connecting portion.

In an exemplary embodiment of the present disclosure, the nozzle may further include a second nozzle portion extending upwards from an upper end portion of the connecting portion, and spaced from the first nozzle portion along a radial direction of the first nozzle portion, upward and downward lengths of the first nozzle portion and the second nozzle portion may correspond to each other.

In another example, the first nozzle portion may have a diameter being greater than a diameter of the second nozzle portion and may be disposed on a radially external side of the second nozzle portion.

In another example, the nozzle may further include a fastening portion protruding upwards from an upper end portion of the connecting portion, a radially external periphery of which is located on an inside of a radially external periphery of the connecting portion, in which a fastening screw thread is formed on an external peripheral surface thereof, and wherein a nozzle screw thread engaged with the fastening screw thread is formed on a lower side of an internal peripheral surface of the first nozzle portion.

In another example, the first nozzle portion may include a coupling area including the nozzle screw thread, and is formed of same material as materials of the second nozzle portion and the connecting portion, and a coating area surrounding an external peripheral surface of the coupling area, and formed of a material being dissimilar to the material of the coupling area.

In another example, the first nozzle portion may be formed in a telescopic form so that an upward and downward length of the first nozzle portion is changeable.

In another example, the first nozzle portion may include a first nozzle member extending upward, and including the nozzle screw thread on a lower side thereof, and a second nozzle member, a diameter of which is smaller than a diameter of the first nozzle member, disposed on an inside of the first nozzle member, and being movable upward with respect to the first nozzle member, a first through-hole may be formed on an upper side of the first nozzle member, a second through-hole may be formed in the second nozzle member, and the first through-hole and the second through-hole may be fluidically-communicating with each other at a predetermined location when the second nozzle member is moved upward with respect to the first nozzle member.

In another example, a plurality of second through-holes may be formed to be disposed along an upward and downward direction, and the upward and downward length of the first nozzle portion may correspond to the upward and downward length of the second nozzle portion when, among the second through-holes, the second through-hole located at a lowermost side and the first through-hole communicate with each other.

In another example, the nozzle may further include a through-member, at least a portion of which is disposed between the first nozzle portion and the second nozzle portion, and disposed at a position corresponding to the first through-hole to pass through the first through-hole and the second through-hole, and an elastic member elastically supporting the through-member to a radially external side of the second nozzle portion.

In another example, the nozzle may further include a third nozzle portion formed between the first nozzle portion and the second nozzle portion, and an upward and downward length of which is smaller than the upward and downward length of the second nozzle portion.

In another example, a plurality of third nozzle portions may be formed to be spaced from each other along the upward and downward direction, and at least some of the plurality of third nozzle portions may contact with the first nozzle portion or the second nozzle portion.

In another example, the first nozzle portion may include a shape of a tube extending upward, and the first nozzle portion may include a diameter being smaller than a diameter of the second nozzle portion and is disposed on a radially internal side of the second nozzle portion.

In another example, the nozzle may further include a fastening portion protruding upwards from an upper end portion of the connecting portion, a radially internal periphery of which is located on an outside of a radially internal periphery of the connecting portion, in which a fastening screw thread is formed on an internal peripheral surface thereof, and a nozzle screw thread engaged with the fastening screw thread may be formed on a lower side of an external peripheral surface of the first nozzle portion.

In another example, the first nozzle portion may include a plurality of stack nozzle members being stacked along an upward and downward direction thereof.

In another example, the stack nozzle member may include an annular body portion, a groove portion recessed downwardly from a radially external or internal upper end portion of the body portion, and a protruding portion protruding downwardly from a portion of a radially external or internal lower end portion of the body portion, at which the groove portion is formed, a screw thread may be formed on an internal peripheral surface of the protruding portion, and the groove portion may include a shape corresponding to a shape of the protruding portion.

In another example, the first nozzle portion may include a finishing nozzle member located on an upper side of, among the plurality of stack nozzle members, the stack nozzle member located on an uppermost side, and an upper surface of the finishing nozzle member may be formed to be flat.

In another example, the stack nozzle member may include an annular hollow in an interior thereof.

In another example, the nozzle portion may further include a fastening portion protruding upwards from an upper end portion of the connecting portion, a radially external periphery of which is located on an inside of a radially external periphery of the connecting portion, and including a fastening screw thread on an external peripheral surface thereof, and wherein a protruding portion of, among the plurality of stack nozzle members, the stack nozzle member located on a lowermost side is engaged with the fastening portion.

In another example, the first nozzle portion may include a plurality of stack nozzle members stacked along an upward and downward direction, and an internal peripheral surface of the stack nozzle member may contact with an external peripheral surface of the second nozzle portion.

According to an aspect of the present disclosure, a pressure vessel includes a nozzle including a discharge passage extending upward in an interior thereof, and extending upward, a liner including an internal space fluidically-communicating with the discharge passage, and connected to a lower side of the nozzle, and a complex material surrounding an external side of the liner, and the nozzle includes a connecting portion connected to the liner, and a tubular first nozzle portion formed separately from the connecting portion.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
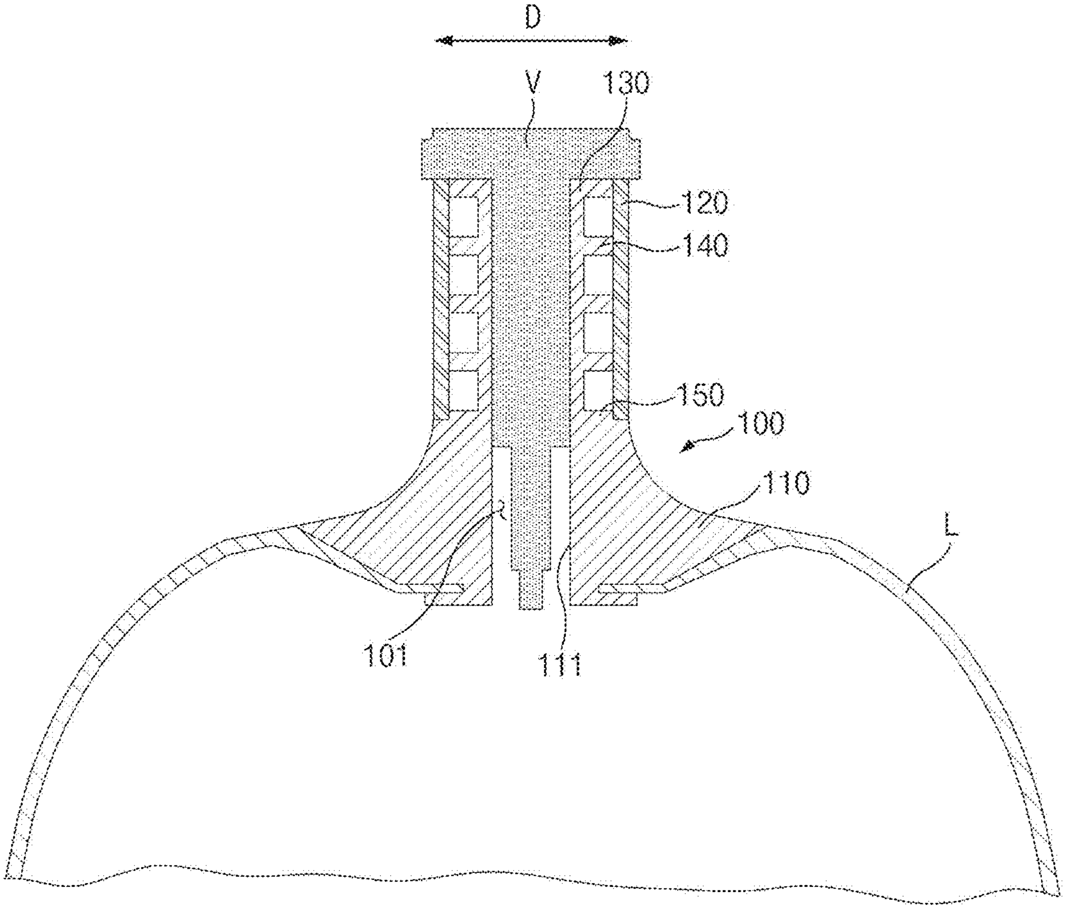
FIG. 1 is a partial cross-sectional view of a pressure vessel including a nozzle for a pressure vessel according to various exemplary embodiments of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In adding reference numerals to the components of the drawings, it is noted that the same components are denoted by the same reference numerals even when they are drawn in different drawings. Furthermore, in describing the exemplary embodiments of the present disclosure, when it is determined that a detailed description of related known configurations and functions may hinder understanding of the exemplary embodiments of the present disclosure, a detailed description thereof will be omitted.

In the specification, a forward/rearward direction, a leftward/rightward direction, and an upward and downward direction, and a vertical direction are referred to for convenience of description, and may be directions that are perpendicular to each other. However, the directions are determined relative to a direction, in which nozzles are disposed, and the upward and downward direction may not necessarily mean the vertical direction. For example, when a pair of nozzles are disposed at opposite end portions of a liner "L", upward directions of the nozzles may be in opposite directions.

Figure 2:
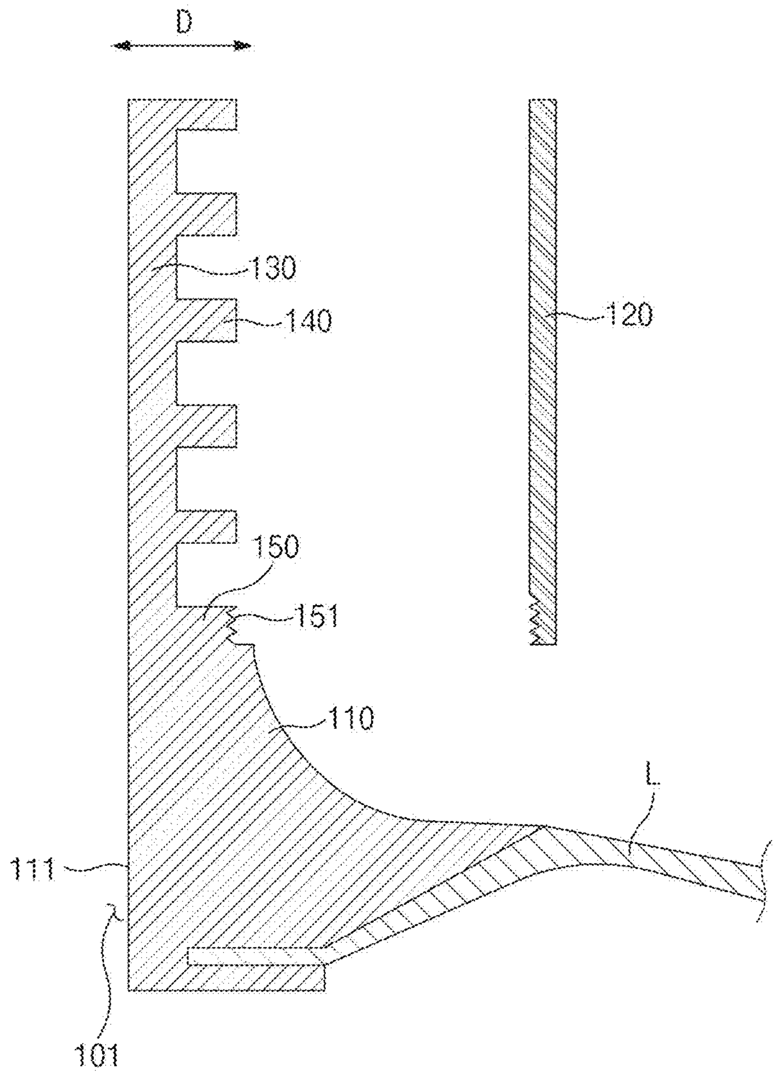
FIG. 2 is a view exemplarily illustrating a state, in which a first nozzle portion of a nozzle for a pressure vessel is separated, according to various exemplary embodiments of the present disclosure.
Figure 3:
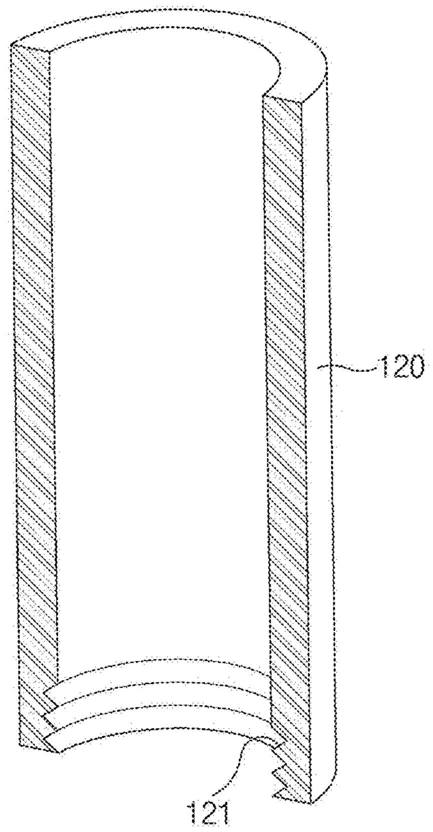
FIG. 3 is a cut-away perspective view of a first nozzle portion of a nozzle for a pressure vessel according to various exemplary embodiments of the present disclosure.
Figure 4:
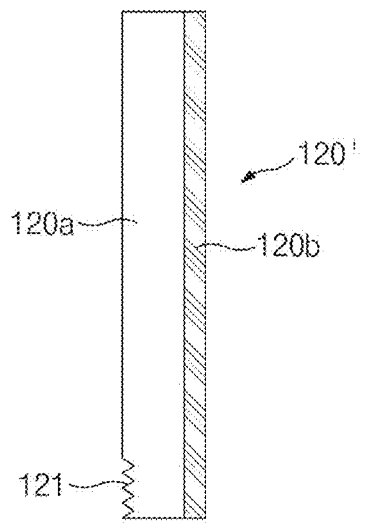
FIG. 4 is a cross-sectional view of another example of a first nozzle portion of a nozzle for a pressure vessel according to various exemplary embodiments of the present disclosure.

FIG. 1 is a partial cross-sectional view of a pressure vessel including a nozzle for a pressure vessel according to various exemplary embodiments of the present disclosure. FIG. 2 is a view exemplarily illustrating a state, in which a first nozzle portion of the nozzle for a pressure vessel is separated, according to the various exemplary embodiments of the present disclosure. FIG. 3 is a cut-away perspective view of the first nozzle portion of the nozzle for a pressure vessel according to the various exemplary embodiments of the present disclosure. FIG. 4 is a cross-sectional view of another example of the first nozzle portion of the nozzle for a pressure vessel according to the various exemplary embodiments of the present disclosure.

A nozzle 100 for a pressure vessel according to an exemplary embodiment of the present disclosure may be a nozzle which is used for a pressure vessel. A pressure vessel may be a vessel for storing a high-pressure gas in an interior thereof.

The pressure vessel may include the nozzle 100, a liner "L", and a complex material. The nozzle 100 may include a discharge passage 101 that extends upward in an interior of the nozzle 100 and may extend upwards. A valve "V" may be disposed in the discharge passage 101. The liner "L" may include an internal space fluidically-communicating with the discharge passage 101. The liner "L" may be connected to a lower side of the nozzle. The liner "L" may be a configuration for maintain an internal airtightness. The complex material may surround an outside of the liner "L". The complex material may be formed by a winding band. The winding band may include a predetermined width and may surround the liner "L". The complex material may be a configuration for supporting an expansion force caused by a high-pressure gas.

Hereinafter, various embodiments of the nozzle 100 for a pressure vessel will be described in detail. The exemplary embodiments of the present disclosure may include a technical commonality in that it includes a detachable configuration and thus defines a hollow in the nozzle.

The nozzle 100 for a pressure vessel according to the various exemplary embodiments of the present disclosure may include a connecting portion 110 and a first nozzle portion 120. The connecting portion 110 includes a lower side which is connected to the liner "L" and may include an internal passage 111 which is fluidically-communicating with an interior of the liner "L". The internal passage 111 may define a portion of the discharge passage 101. The first nozzle portion 120 may be formed separately from the connecting portion 110. The first nozzle portion 120 may be disposed on an upper side of the connecting portion 110.

The first nozzle portion 120 may be detachable. As an exemplary embodiment of the present disclosure, the first nozzle portion 120 may be separably coupled to a fastening portion 150, which will be described later, by screw thread coupling. However, the present disclosure is not limited thereto, and various methods, such as a magnetic method or a method using adhesive, may be considered. The first nozzle portion 120 may be formed in a shape of a tube.

Hereinafter, a structure which the nozzle 100 for a pressure vessel according to the various exemplary embodiments of the present disclosure may furthermore have will be described in detail.

The nozzle 100 for a pressure vessel according to the various exemplary embodiments of the present disclosure may further include a second nozzle portion 130. The second nozzle portion 130 may extend upwards from an upper end portion of the connecting portion 110, and may be spaced from the first nozzle portion 120 along a radial direction "D" of the first nozzle portion 120. Here, the radial direction "D" refers to a direction, in which a periphery is viewed from a center, and will be regarded not as a description that limits the shape of the first nozzle portion 120 to a shape of cylinder. The second nozzle portion 130 may be formed integrally with the connecting portion 110. The second nozzle portion 130 may define a discharge passage 101 together with the internal passage 111.

The upward and downward lengths of the first nozzle portion 120 and the second nozzle portion 130 may correspond to each other. The first nozzle portion 120 includes a diameter greater than a diameter of the second nozzle portion 130, and may be disposed on a radially external side of the second nozzle portion 130.

The nozzle 100 for a pressure vessel according to the various exemplary embodiments of the present disclosure may further include the fastening portion 150. The fastening portion 150 may be a portion that protrudes upwards from the upper end portion of the connecting portion 110, and a radially external periphery of which is located on an internal side of a radially external periphery of the connecting portion 110. A shape of the nozzle 100 for a pressure vessel considering the fastening portion 150 may be similar to a shape, in which a portion of the upper end portion of the connecting portion 110, which is located on a radially external side, is recessed downward.

A fastening screw thread 151 may be formed on an external peripheral surface of the fastening portion 150. A nozzle screw thread 121 which is engaged with the fastening screw thread 151 may be formed on a lower side of the internal peripheral surface of the first nozzle portion 120.

The fastening portion 150 may be formed integrally with the connecting portion 110. The first nozzle portion 120 may be formed of a material which is dissimilar to that of the connecting portion 110. Accordingly, the material of the first nozzle portion 120 may be a complex material and a material that causes little or no galvanic corrosion. For example, the first nozzle portion 120 may be one or a combination of a zinc coating layer, a cadmium coating layer, an ion deposition coating layer, a resin, a Teflon film, and an anodizing surface treatment layer.

However, the present disclosure is not limited thereto, and as an exemplary embodiment of the present disclosure, the first nozzle portion 120' may include a coupling area **120*a* and a coating area 120*b*. The coupling area 120*a* may be an area, in which the nozzle screw thread 121 is formed, and which is formed of same material as materials of the second nozzle portion 130 and the connecting portion 110. The coating area 120*b* may be an area that surrounds an external peripheral surface of the coupling area 120*a* and is formed of a material dissimilar to the material of the coupling area 120*a*. Accordingly, the material of the coating area 120*b* may be a complex material or a material that causes little or no galvanic corrosion. For example, the coating area 120*b*** may be one or a combination of a zinc coating layer, a cadmium coating layer, an ion deposition coating layer, a resin, a Teflon film, and an anodizing surface treatment layer.

The nozzle 100 for a pressure vessel according to the various exemplary embodiments of the present disclosure may further include a third nozzle portion 140. The third nozzle portion 140 may be formed between the first nozzle portion 120 and the second nozzle portion 130.

For example, as illustrated in the drawing, the third nozzle portion 140 may protrude from the second nozzle portion 130 toward the first nozzle portion 120. However, the present disclosure is not limited thereto, and the third nozzle portion 140 may protrude from the first nozzle portion 120 toward the second nozzle portion 130. In the instant case, the third nozzle portion 140 may include an integral structure with the first nozzle portion 120.

The third nozzle portion 140 may be a portion, an upward and downward length of which is smaller than the upward and downward length of the second nozzle portion 130. A plurality of third nozzle portions 140 may be formed, and may be spaced from each other in the upward and downward direction thereof.

At least some of the plurality of third nozzle portions 140 may contact with the first nozzle portion 120. This may mean that a hollow is formed between the third nozzle portions 140 in the nozzle 100 for a pressure vessel. However, when the third nozzle portion 140 protrudes from the first nozzle portion 120 toward the second nozzle portion 130, the third nozzle portion 140 may contact with the second nozzle portion 130.

Figure 5:
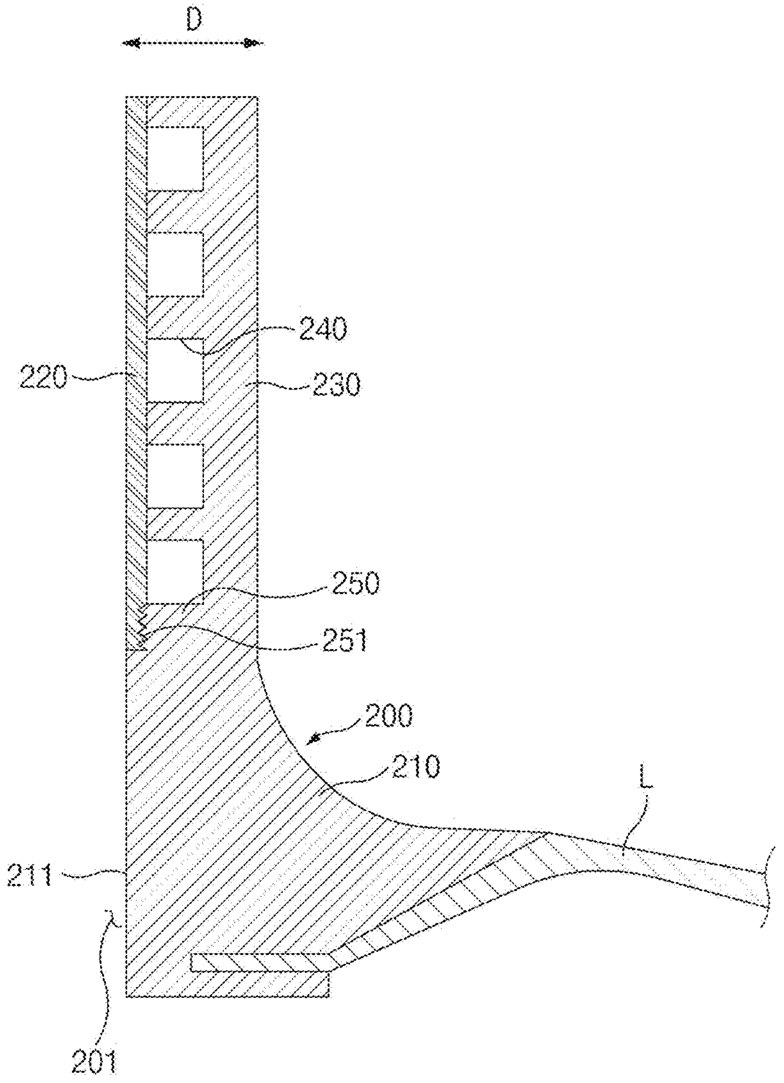
FIG. 5 is a partial cross-sectional view of a pressure vessel including a nozzle for a pressure vessel according to various exemplary embodiments of the present disclosure.
Figure 6:
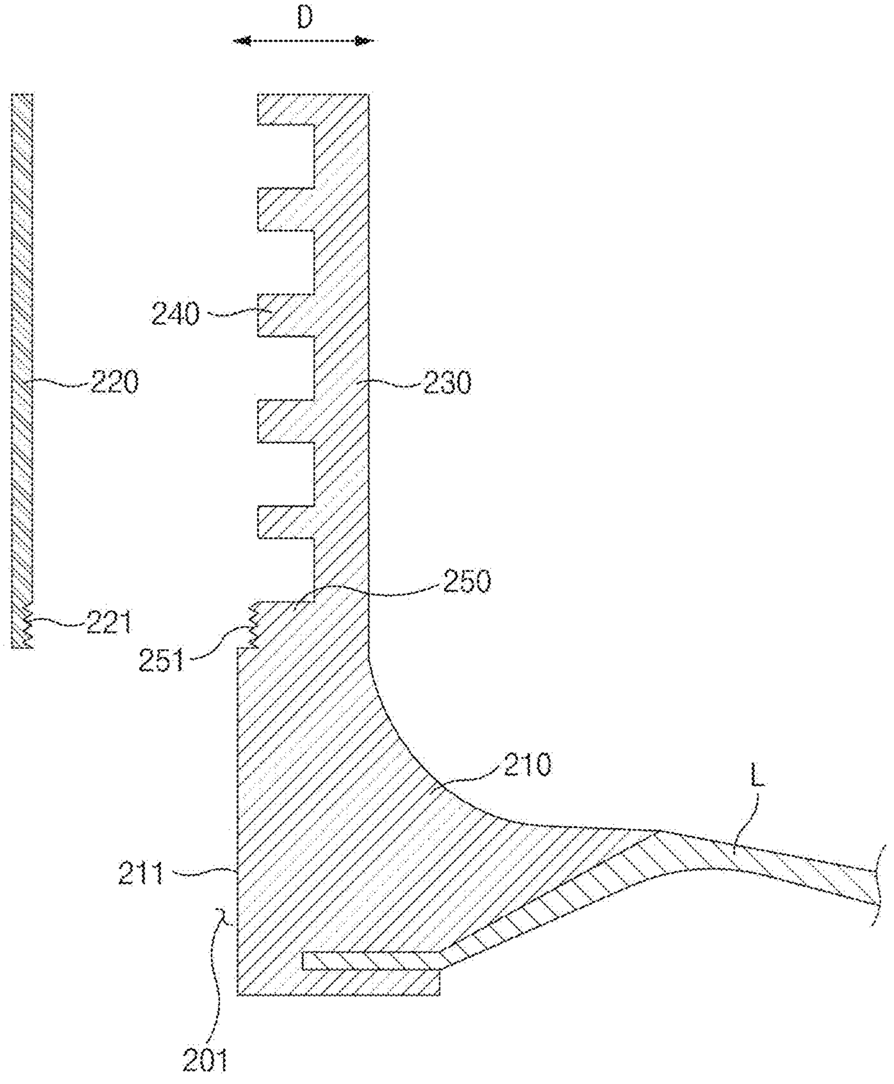
FIG. 6 is a view exemplarily illustrating a state, in which a first nozzle portion of a nozzle for a pressure vessel is separated, according to various exemplary embodiments of the present disclosure.
Figure 7:
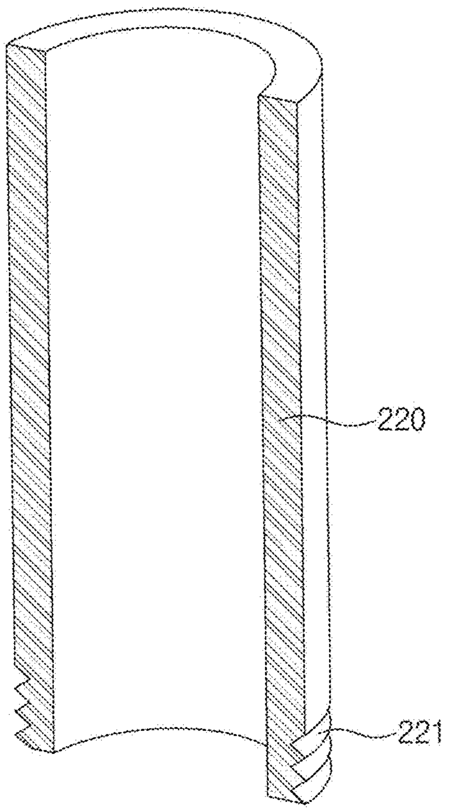
FIG. 7 is a cut-away perspective view of a first nozzle portion of a nozzle for a pressure vessel according to various exemplary embodiments of the present disclosure.

FIG. 5 is a partial cross-sectional view of a pressure vessel including a nozzle for a pressure vessel according to various exemplary embodiments of the present disclosure. FIG. 6 is a view exemplarily illustrating a state, in which a first nozzle portion of the nozzle for a pressure vessel is separated, according to various exemplary embodiments of the present disclosure. FIG. 7 is a cut-away perspective view of the first nozzle portion of the nozzle for a pressure vessel according to various exemplary embodiments of the present disclosure.

Hereinafter, a nozzle 100 for a pressure vessel according to the various exemplary embodiments of the present disclosure will be described with reference to FIG. 5, FIG. 6 and FIG. 7. A nozzle 200 for a pressure vessel according to the various exemplary embodiments are different from the nozzle 100 for a pressure vessel according to the various exemplary embodiments of the present disclosure in FIG. 1, in a position of the first connecting portion 110. Components that are the same as or equivalent to those of the nozzle 100 for a pressure vessel according to the various exemplary embodiments are assigned the same or equivalent reference numerals, and a detailed description thereof will be omitted.

A first nozzle portion 220 of the nozzle 200 for a pressure vessel according to the various exemplary embodiments of the present disclosure may be formed in a shape of a tube that extends upwards. The first nozzle portion 220 includes a smaller diameter than that of the second nozzle portion 230 and may be disposed on a radially internal side of a second nozzle portion 230. The first nozzle portion 220 may form a discharge passage 201 together with an internal passage 211.

A fastening portion 250 of the nozzle 200 for a pressure vessel according to the various exemplary embodiments of the present disclosure may protrude upwards from an upper end portion of a connecting portion 210, and a radially internal periphery thereof may be located on an external side of a radially internal periphery of the connecting portion 210. The fastening portion 250 may include a fastening screw thread 251 which is formed on an internal peripheral surface thereof. A nozzle screw thread 221 which is engaged with the fastening screw thread 251 may be formed on a lower side of an external peripheral surface of the first nozzle portion 220.

The third nozzle portion 240 may protrude from the second nozzle portion 230 toward the first nozzle portion 220. Accordingly, a protrusion direction of the third nozzle portion 240 of the nozzle 200 for a pressure vessel according to the various exemplary embodiments in FIG. 5 and a protrusion direction of the third nozzle portion 140 of the nozzle 100 for a pressure vessel according to the various exemplary embodiments of the present disclosure in FIG. 1 may be opposite to each other.

Here, the third nozzle portion 240 may also protrude from the first nozzle portion 220 toward the second nozzle portion

230. In the instant case, the third nozzle portion 240 may include an integral structure with the first nozzle portion 220.

Figure 8:
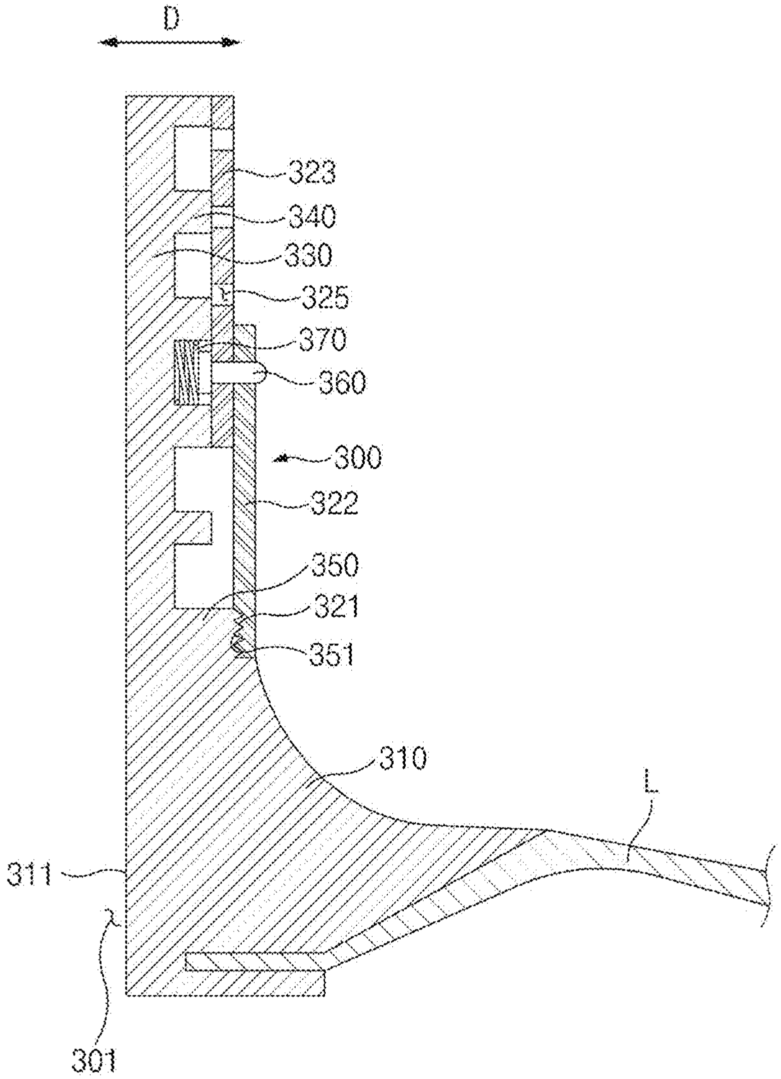
FIG. 8 is a partial cross-sectional view of a pressure vessel including a nozzle for a pressure vessel according to various exemplary embodiments of the present disclosure.
Figure 9:
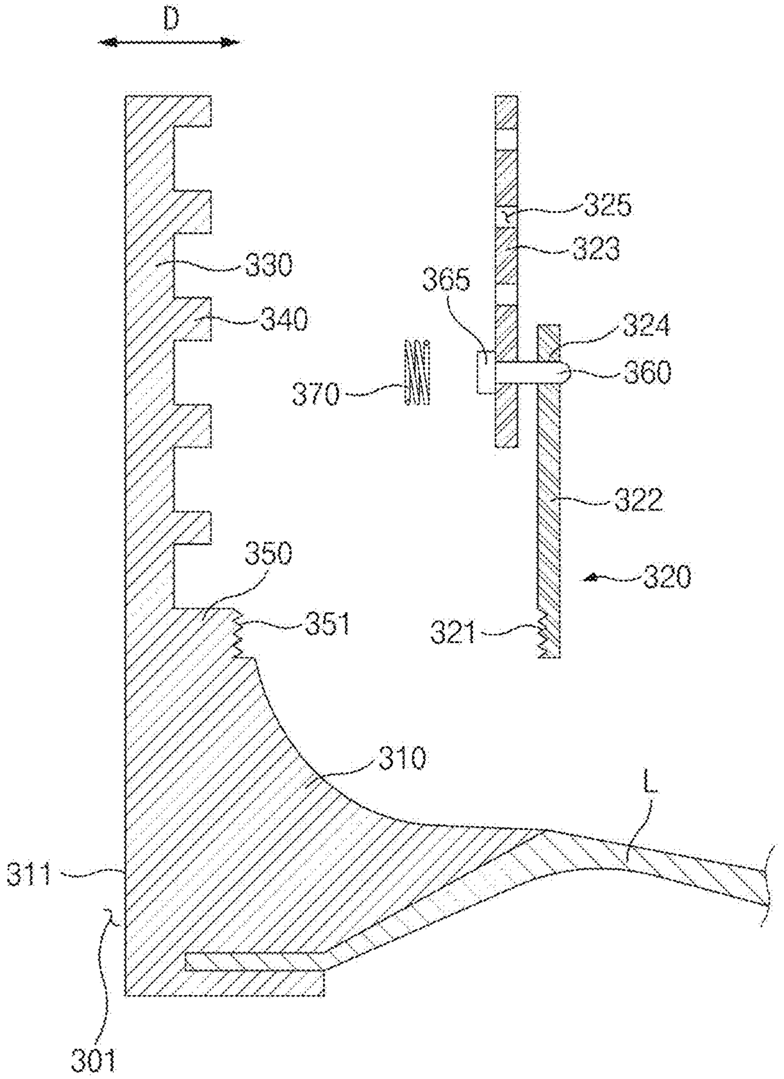
FIG. 9 is a view exemplarily illustrating a state, in which a first nozzle portion of a nozzle for a pressure vessel is separated, according to various exemplary embodiments of the present disclosure.
Figure 10:
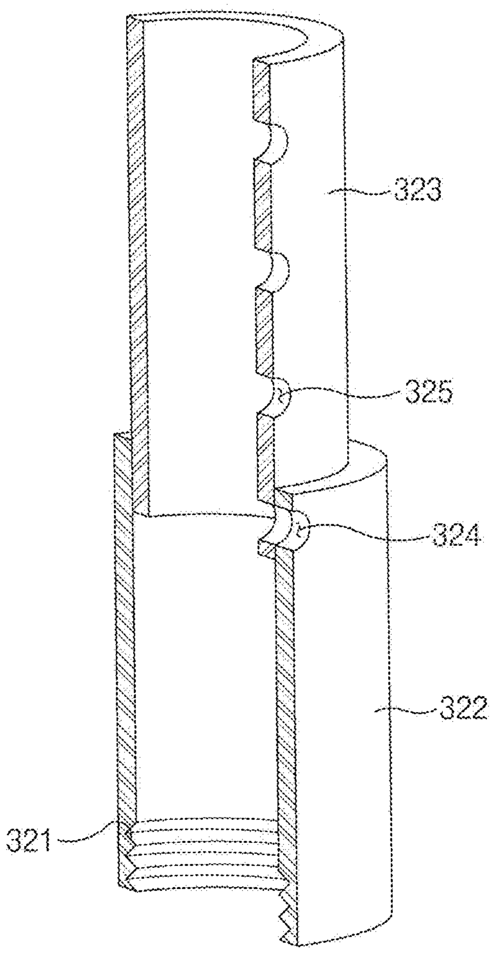
FIG. 10 is a cut-away perspective view of a first nozzle member and a second nozzle member of a nozzle for a pressure vessel according to various exemplary embodiments of the present disclosure.

FIG. 8 is a partial cross-sectional view of a pressure vessel including a nozzle for a pressure vessel according to various exemplary embodiments of the present disclosure. FIG. 9 is a view exemplarily illustrating a state, in which a first nozzle portion of the nozzle for a pressure vessel is separated, according to the various exemplary embodiments of the present disclosure. FIG. 10 is a cut-away perspective view of a first nozzle member and a second nozzle member of the nozzle for a pressure vessel according to the various exemplary embodiments of the present disclosure.

Hereinafter, a nozzle 100 for a pressure vessel according to various exemplary embodiments of the present disclosure will be described with reference to FIG. 8, FIG. 9 and FIG. 10. A nozzle 300 for a pressure vessel according to the various exemplary embodiments are different from the nozzle 100 for a pressure vessel according to the various exemplary embodiments in FIG. 1 in that it includes a structure, a length of which is changeable. Components that are the same as or equivalent to those of the nozzle 100 for a pressure vessel according to the various exemplary embodiments are assigned the same or equivalent reference numerals, and a detailed description thereof will be omitted.

The first nozzle portion 320 of the nozzle 300 for a pressure vessel according to the various exemplary embodiments are formed in a telescopic form, and an upward and downward length thereof may be changeable. As an exemplary embodiment of the present disclosure, the first nozzle portion 320 may include a first nozzle member 322 and a second nozzle member 323. The first nozzle member 322 may be a member that extends upward and includes a nozzle screw thread 321 on lower side thereof. The nozzle screw thread 321 may be engaged with a fastening screw thread 351 which is formed in the fastening portion 350.

The fastening portion 350 may protrude upwards from an upper end portion of a connecting portion 310, a radially external periphery thereof may be located on an internal side of a radially external periphery of the connecting portion 310, and a fastening screw thread 351 may be formed on an external peripheral surface thereof.

The second nozzle member 323 may be a member that includes a smaller diameter than that of the first nozzle member 322 and is disposed on an internal side of the first nozzle member 322. The second nozzle member 323 may be moved upward with respect to the first nozzle member 322.

A first through-hole 324 may be formed on an upper side of the first nozzle member 322. A second through-hole 325 may be formed in the second nozzle member 323. When the second nozzle member 323 is moved upward with respect to the first nozzle member 322, the first through-hole 324 and the second through-hole 325 may communicate with each other at a specific position.

A plurality of second through-holes 325 may be formed, and may be disposed along the upward and downward direction thereof. However, it is possible to form a plurality of first through-holes 324 instead of the plurality of second through-holes 325 and to arrange them in the upward and downward direction thereof.

When, among the second through-holes 325, the second through-hole 325 which is located on a lowermost side and the first through-hole 324 communicate with each other, an upward and downward length of the first nozzle portion 320 may correspond to an upward and downward length of the second nozzle portion 330. When a plurality of first through-holes 324 is formed, an upward and downward length of the first nozzle portion 320 may correspond to an upward and downward length of the second nozzle portion 330 when, among the first through-holes 324, the first through-hole 324 located on an uppermost side and the second through-hole 325 may be communicated with each other. Accordingly, the second nozzle portion 330 may form a discharge passage 301 together with an internal passage 311 of the connecting portion 310.

The third nozzle portion 340 may protrude from the second nozzle portion 330 toward the first nozzle portion 320. Accordingly, at least a portion of the third nozzle portion 340 may contact with the first nozzle portion 320.

The nozzle 100 for a pressure vessel according to the various exemplary embodiments of the present disclosure may further include a through-member 360 and an elastic member 370. At least a portion of the through-member 360 may be disposed between the first nozzle portion 320 and the second nozzle portion 330 and may be disposed at a position corresponding to the first through-hole 324 to pass through the first through-hole 324 and the second through-hole 325. The through-member 360 may include a portion 365 that includes a diameter greater than a diameter of a portion that passes through the first through-hole 324 and the second through-hole 325 and is disposed between the first nozzle portion 320 and the second nozzle portion 330.

The elastic member 370 may elastically support the through-member 360 to a radially external side with respect to the second nozzle portion 330. The elastic member 370 may move the through-member 360 to the radially external side when the first through-hole 324 and the second through-hole 325 are communicated with each other.

In the case of the nozzle 300 for a pressure vessel according to the various exemplary embodiments of the present disclosure, the length of the nozzle may be changed as needed, and thus, it is applicable to the neck mounting method and the valley mounting method with one nozzle.

Figure 11:
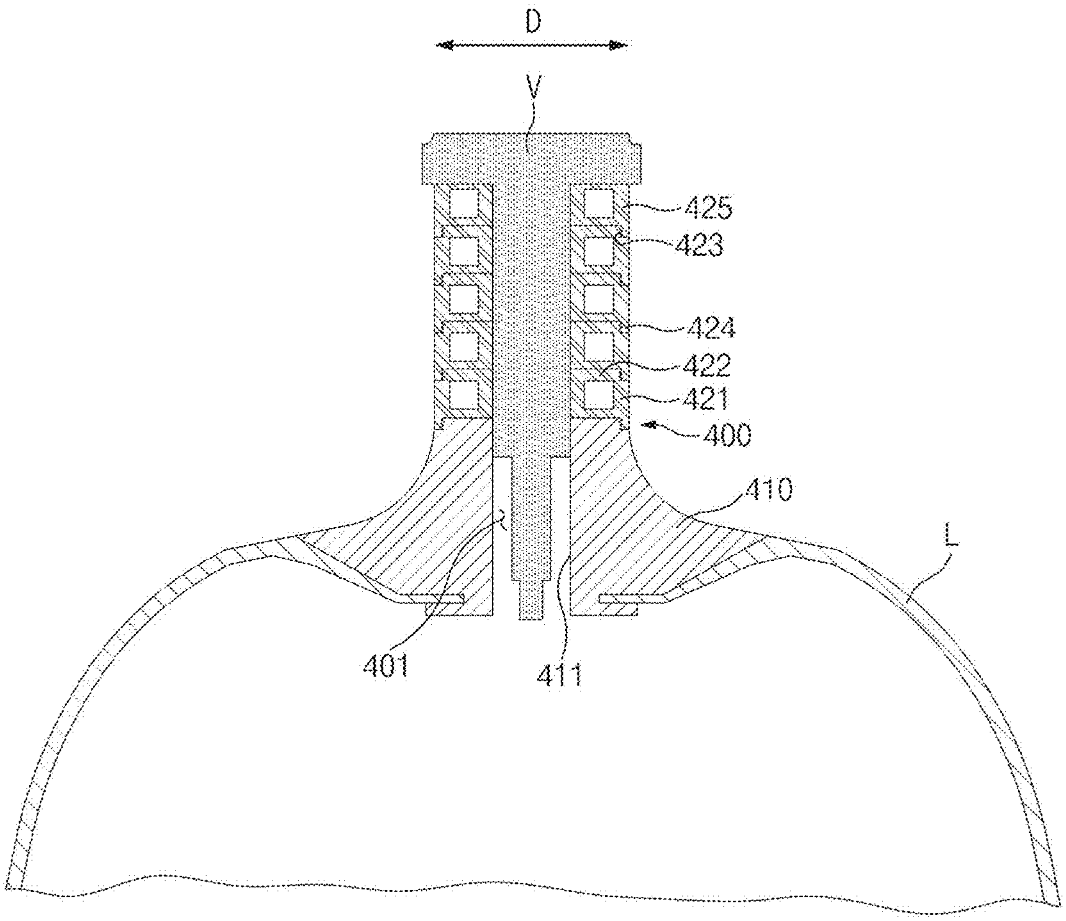
FIG. 11 is a partial cross-sectional view of a pressure vessel including a nozzle for a pressure vessel according to various exemplary embodiments of the present disclosure.
Figure 12:
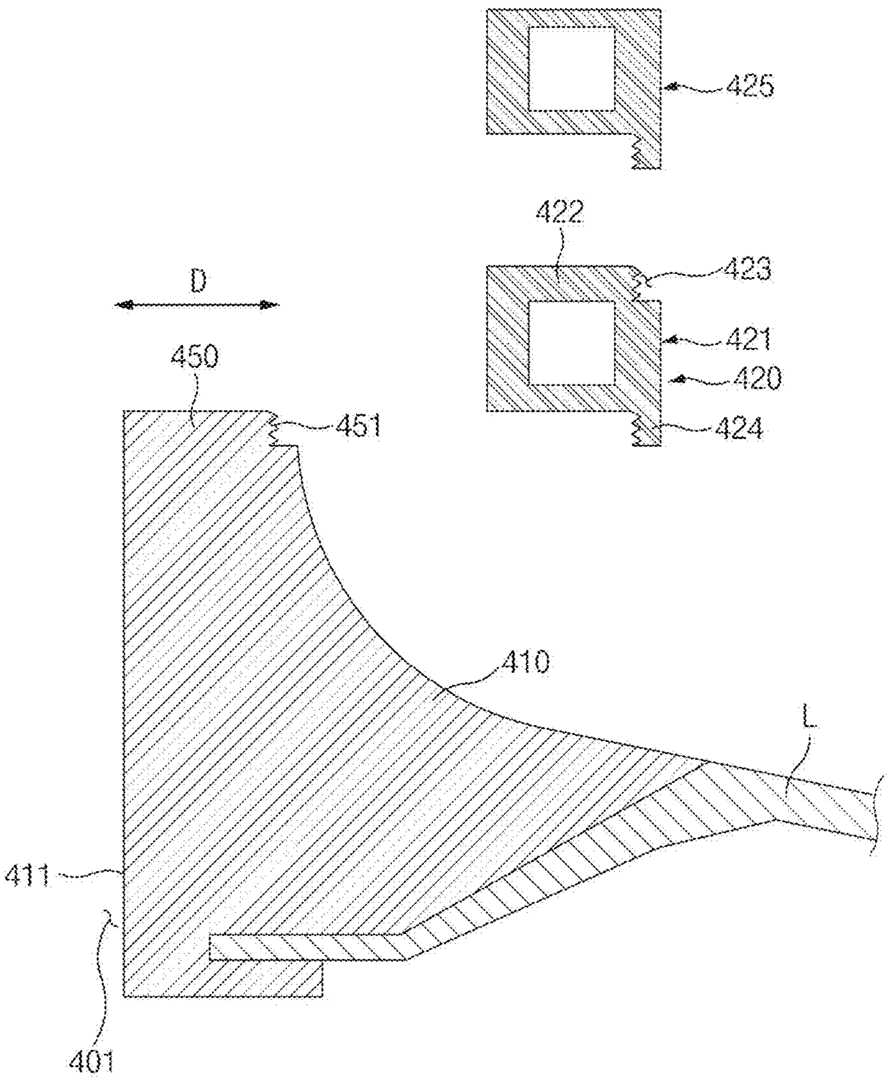
FIG. 12 is a view exemplarily illustrating a state, in which a first nozzle portion of a nozzle for a pressure vessel is separated, according to various exemplary embodiments of the present disclosure.
Figure 13:
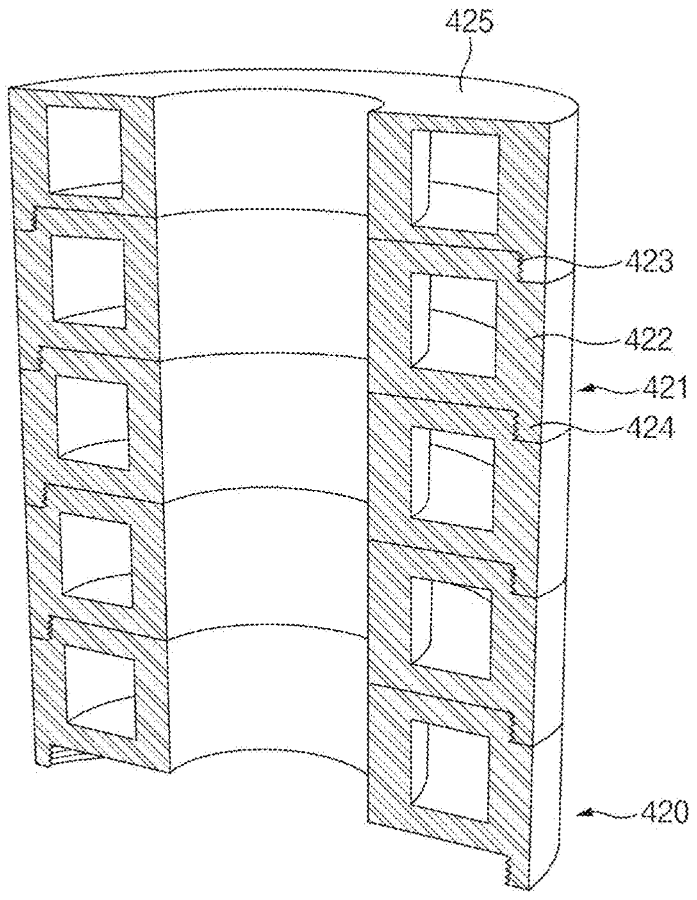
FIG. 13 is a cut-away perspective view of a first nozzle portion of a nozzle for a pressure vessel according to various exemplary embodiments of the present disclosure.

FIG. 11 is a partial cross-sectional view of a pressure vessel including a nozzle for a pressure vessel according to various exemplary embodiments of the present disclosure. FIG. 12 is a view exemplarily illustrating a state, in which a first nozzle portion of the nozzle for a pressure vessel is separated, according to the various exemplary embodiments of the present disclosure. FIG. 13 is a cut-away perspective view of a first nozzle portion of the nozzle for a pressure vessel according to the various exemplary embodiments of the present disclosure.

Hereinafter, a nozzle 100 for a pressure vessel according to the various exemplary embodiments of the present disclosure will be described with reference to FIG. 11, FIG. 12 and FIG. 13. A nozzle 400 for a pressure vessel according to the various exemplary embodiments are different from the nozzle 100 for a pressure vessel according to the various exemplary embodiments in FIG. 1 in that it has stack nozzle members 421. Components that are the same as or equivalent to those of the nozzle 100 for a pressure vessel according to the various exemplary embodiments in FIG. 1 are assigned the same or equivalent reference numerals, and a detailed description thereof will be omitted.

The first nozzle portion 420 of the nozzle 400 for a pressure vessel according to the various exemplary embodiments of the present disclosure may include a plurality of stack nozzle members 421. The plurality of stack nozzle members 421 may be stacked along the upward and downward direction thereof. The stack nozzle member 421 may include a body portion 422, a groove portion 423, and a protruding portion 424. The body portion 422 may be formed in an annular shape. An internal peripheral surface of the body portion 422 may define a discharge passage 401 together with an internal passage 411 of a connecting portion 410.

The groove portion 423 may be formed to be recessed downwardly from a radially external side upper end portion of the body portion 422. The protruding portion 424 may protrude downwardly from a lower end portion of a radially external side of the body portion 422. A screw thread may be formed on an internal peripheral surface of the protruding portion 424, and the groove portion 423 may include a shape corresponding to a shape of the protruding portion 424.

However, the present disclosure is not limited thereto, and the groove portion 423 may be formed to be recessed downwardly from the radially internal side upper end portion of the body portion 422. The protruding portion 424 may protrude downwardly from a lower end portion of the body portion 422 in a radially internal side. A screw thread may be formed on an external peripheral surface of the protruding portion 424, and the groove portion 423 may include a shape corresponding to a shape of the protruding portion 424.

The first nozzle portion 420 may further include a finishing nozzle member 425. The finishing nozzle member 425 may be located on an upper side of, among the plurality of stack nozzle members 421, the stack nozzle member 421 located on an uppermost side thereof. An upper surface of the finishing nozzle member 425 may be formed to be flat. This may mean that a shape of the finishing nozzle member 425 corresponds to a shape of the stack nozzle member 421 with no groove portion 423.

A valve "V" may be accommodated on an upper surface of the finishing nozzle member 425. However, when the finishing nozzle member 425 is not included, a structure corresponding to the shape of the protruding portion 424 may be formed in the valve "V", and may be fastened to the groove portion 423 of the stack nozzle member 421 located on the uppermost side thereof.

An annular hollow may be formed in an interior of the stack nozzle member 421. The finishing nozzle member 425 may also include an annular hollow in an interior thereof.

Meanwhile, the nozzle 400 for a pressure vessel according to the various exemplary embodiments of the present disclosure may further include a fastening portion 450. Like in the nozzle 100 for a pressure vessel according to the various exemplary embodiments of the present disclosure in FIG. 1, the fastening portion 450 may protrude upwards from an upper end portion of a connecting portion 410, and a radially external periphery thereof may be located on an internal side of a radially external periphery of the connecting portion 410, and a fastening screw thread 451 may be formed on an external peripheral surface thereof. The protruding portion 424 of, among the plurality of stack nozzle members 421, the stack nozzle member 421 located on a lowermost side may be engaged with the fastening portion 450.

Figure 14:
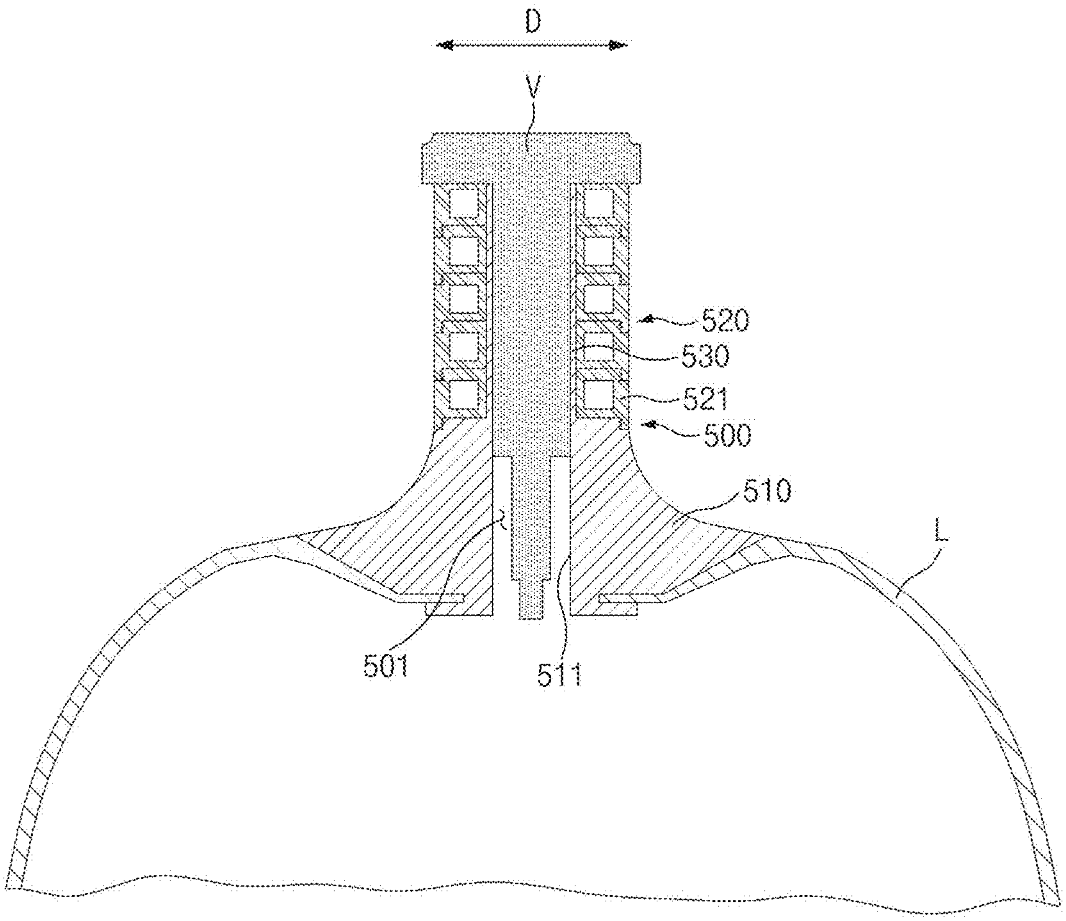
FIG. 14 is a partial cross-sectional view of a pressure vessel including a nozzle for a pressure vessel according to various exemplary embodiments of the present disclosure.
Figure 15:
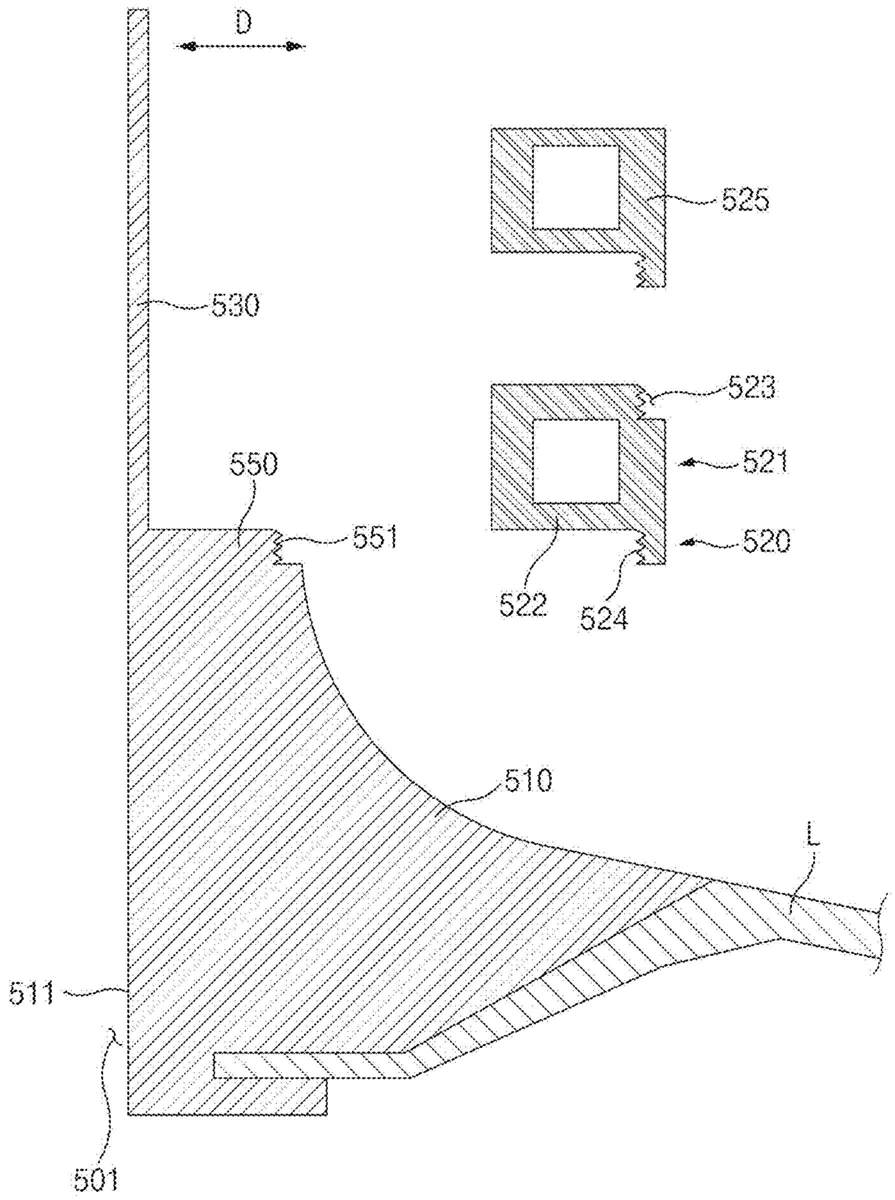
FIG. 15 is a view exemplarily illustrating a state, in which a first nozzle portion of a nozzle for a pressure vessel is separated, according to various exemplary embodiments of the present disclosure.

FIG. 14 is a partial cross-sectional view of a pressure vessel including a nozzle for a pressure vessel according to various exemplary embodiments of the present disclosure. FIG. 15 is a view exemplarily illustrating a state, in which a first nozzle portion of the nozzle for a pressure vessel is separated, according to the various exemplary embodiments of the present disclosure.

Hereinafter, a nozzle 100 for a pressure vessel according to the various exemplary embodiments of the present disclosure in FIG. 1 will be described with reference to FIGS. 14 to 15. A nozzle 500 for a pressure vessel according to the various exemplary embodiments are different from the nozzle 100 for a pressure vessel according to the various exemplary embodiments in that it includes a second nozzle portion 530. Components that are the same as or equivalent to those of the nozzle 100 for a pressure vessel according to the various exemplary embodiments in FIG. 1 are assigned the same or equivalent reference numerals, and a detailed description thereof will be omitted.

A first nozzle portion 520 of the nozzle 500 for a pressure vessel according to the various exemplary embodiments of the present disclosure may include a plurality of stack nozzle members 421 which may be stacked along the upward and downward direction thereof. The nozzle 500 for a pressure vessel according to the various exemplary embodiments of the present disclosure may further include the second nozzle portion 530. The second nozzle portion 530 may extend upwards from an upper end portion of a connecting portion 510, and may be spaced from the first nozzle portion 520 along a radial direction "D" of the first nozzle portion 520. The second nozzle portion 530 may form a discharge passage 501 together with an internal passage 511.

Upward and downward lengths of the first nozzle portion 520 and the second nozzle portion 530 may correspond to each other. The first nozzle portion 520 includes a diameter greater than a diameter of the second nozzle portion 530, and may be disposed on a radially external side of the second nozzle portion 530. Accordingly, an internal peripheral surface of a stack nozzle member 521 may contact with an external peripheral surface of the second nozzle portion 530.

The first nozzle portion 520 may include a plurality of stack nozzle members 521. The plurality of stack nozzle members 521 may be stacked along the upward and downward direction thereof. The stack nozzle members 521 may include a body portion 522, a groove portion 523, and a protruding portion 524. The body portion 522 may be formed in an annular shape. An internal peripheral surface of the body portion 522 may define a discharge passage 501 together with the internal passage 511 of the connecting portion 510.

The groove portion 523 may be formed to be recessed downwardly from an upper end portion of the body portion 522 on the radially external side. The protruding portion 524 may protrude downwardly from a lower end portion of the body portion 522 on the radially external side. A screw thread may be formed on an internal peripheral surface of the protruding portion 524, and the groove portion 523 may include a shape corresponding to a shape of the protruding portion 524.

The first nozzle portion 520 may include a finishing nozzle member 525. The finishing nozzle member 525 may be located on an upper side of, among the plurality of stack nozzle members 521, the stack nozzle member 521 located on the uppermost side thereof. An upper surface of the finishing nozzle member 525 may be formed to be flat. This may mean that a shape of the finishing nozzle member 525 corresponds to a shape of the stack nozzle member 521 with no groove portion 523.

An annular hollow may be formed in an interior of the stack nozzle member 521. The finishing nozzle member 525 may also include an annular hollow in an interior thereof.

Meanwhile, the nozzle 500 for a pressure vessel according to the various exemplary embodiments of the present disclosure may further include a fastening portion 550. Like in the nozzle 100 for a pressure vessel according to the various exemplary embodiments of the present disclosure, the fastening portion 550 may protrude upwards from an upper end portion of the connecting portion 510, and a radially external periphery thereof may be located on an internal side of a radially external periphery of the connecting portion 510, and a fastening screw thread 551 may be formed on am external peripheral surface thereof. The protruding portion 524 of, among the plurality of stack nozzle members 521, the stack nozzle member 521 located on a lowermost side may be engaged with the fastening portion 550.

In the case of the nozzle 500 for a pressure vessel according to the various exemplary embodiments of the present disclosure, the second nozzle portion 530 is configured as a guide for the stack nozzle member 521, and may define the discharge passage 501 together with the internal passage 511 of the connecting portion 510 whereby an airtightness and a robustness against hydrogen may be improved.

According to an exemplary embodiment of the present disclosure, because a portion of the nozzle is formed to be detachable, and a hollow is formed inside, which may reduce a weight of the nozzle, the weight of the pressure vessel may be reduced and an operating efficiency of an object in which the pressure vessel is provided, may be increased.

Furthermore, according to an exemplary embodiment of the present disclosure, because the length of the nozzle is adjustable, one nozzle may be applied to various positions that require a change in length whereby a process of producing the nozzle may be simplified.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A nozzle connected to a liner forming a pressure vessel, the nozzle comprising:

a connecting portion, a lower side of which is connected to the liner, and including an internal passage fluidically-communicating with an interior of the liner;

a tubular first nozzle portion mounted on an upper side of the connecting portion, and being detachable from the connecting portion;

a second nozzle portion extending upwards from an upper end portion of the connecting portion, and spaced from the first nozzle portion along a radial direction of the first nozzle portion, wherein the first nozzle portion includes a diameter being greater than a diameter of the second nozzle portion and is disposed on a radially external side of the second nozzle portion; and a fastening portion protruding upwards from the upper end portion of the connecting portion, wherein a fastening screw thread is formed on an external peripheral surface thereof; and wherein a nozzle screw thread engaged with the fastening screw thread is formed on a lower side of an internal peripheral surface of the first nozzle portion, wherein the first nozzle portion is formed in a telescopic form so that an upward and downward length of the first nozzle portion is changeable.

2. The nozzle of claim 1, wherein the first nozzle portion includes:

a coupling area including the nozzle screw thread, and formed of same material as materials of the second nozzle portion and the connecting portion; and a coating area surrounding an external peripheral surface of the coupling area, and formed of a material being dissimilar to the material of the coupling area.

3. The nozzle of claim 1, wherein the first nozzle portion includes:

a first nozzle member extending upward, and including the nozzle screw thread on a lower side thereof; and a second nozzle member, a diameter of which is smaller than a diameter of the first nozzle member, disposed on an inside of the first nozzle member, and being movable upward with respect to the first nozzle member, wherein a first through-hole is formed on an upper side of the first nozzle member, wherein a second through-hole is formed in the second nozzle member, and wherein the first through-hole and the second through-hole communicate with each other at a predetermined location in a state that the second nozzle member is moved upward with respect to the first nozzle member.

4. The nozzle of claim 3, wherein a plurality of second through-holes are formed to be disposed along an upward and downward direction, and wherein the upward and downward length of the first nozzle corresponds to the upward and downward length of the second nozzle portion in a state that, among the second through-holes, the second through-hole located at a lowermost side and the first through-hole communicate with each other.

5. The nozzle of claim 3, further including:

a through-member, at least a portion of which is disposed between the first nozzle portion and the second nozzle portion, and disposed at a position corresponding to the first through-hole to pass through the first through-hole and the second through-hole; and an elastic member elastically supporting the through-member to a radially external side of the second nozzle portion.

6. The nozzle of claim 1, further including:

a third nozzle portion formed between the first nozzle portion and the second nozzle portion, and an upward and downward length of which is smaller than the upward and downward length of the second nozzle portion.

7. The nozzle of claim 6, wherein a plurality of third nozzle portions are formed to be spaced from each other along an axial direction of the nozzle, and wherein at least some of the plurality of third nozzle portions contact with the first nozzle portion or the second nozzle portion.

8. A pressure vessel comprising:

a nozzle including a discharge passage extending upward in an interior thereof;

a liner including an internal space fluidically-communicating with the discharge passage, and connected to a lower side of the nozzle; and a complex material surrounding an external side of the liner, wherein the nozzle includes:

a connecting portion connected to the liner;

a tubular first nozzle portion formed separately from the connecting portion;

a second nozzle portion extending upwards from an upper end portion of the connecting portion, and spaced from the first nozzle portion along a radial direction of the first nozzle portion, wherein the first nozzle portion includes a diameter being greater than a diameter of the second nozzle portion and is disposed on a radially external side of the second nozzle portion, a fastening portion protruding upwards from the upper end portion of the connecting portion, wherein a fastening screw thread is formed on an external peripheral surface thereof; and wherein a nozzle screw thread engaged with the fastening screw thread is formed on a lower side of an internal peripheral surface of the first nozzle portion, wherein the first nozzle portion is formed in a telescopic form so that an upward and downward length of the first nozzle portion is changeable.

* * * * *